United States Patent
Fuglsang et al.

(10) Patent No.: US 9,695,800 B2
(45) Date of Patent: Jul. 4, 2017

(54) WIND TURBINE BLADE WITH PLURALITY OF LONGITUDINALLY EXTENDING FLOW GUIDING DEVICE PARTS

(75) Inventors: Peter Fuglsang, Vejle (DK); Stefano Bove, Lunderskov (DK); Subrahmanyam Venkata Vemulapati, Ongole (IN); Brian Lund, Esbjerg (DK); Lars E. Jensen, Hedensted (DK); Sreeram Kottumuklu Radhakrishnan, Kolding (DK)

(73) Assignee: LM GLASFIBER A/S, Kolding (DK)

( * ) Notice: Subject to any disclaimer, the term of this patent is extended or adjusted under 35 U.S.C. 154(b) by 753 days.

(21) Appl. No.: 13/500,673

(22) PCT Filed: Oct. 8, 2010

(86) PCT No.: PCT/EP2010/065075
§ 371 (c)(1),
(2), (4) Date: Apr. 6, 2012

(87) PCT Pub. No.: WO2011/042527
PCT Pub. Date: Apr. 14, 2011

(65) Prior Publication Data
US 2012/0195764 A1    Aug. 2, 2012

(30) Foreign Application Priority Data
Oct. 8, 2009 (EP) .................................. 09172594

(51) Int. Cl.
*F03D 1/06* (2006.01)

(52) U.S. Cl.
CPC ...... *F03D 1/0641* (2013.01); *F05B 2240/121* (2013.01); *F05B 2240/301* (2013.01); *Y02E 10/721* (2013.01)

(58) Field of Classification Search
CPC ........... F05B 2240/32; F05B 2240/301; Y02E 10/721; F03D 1/0641
USPC .......... 415/4.3, 4.5, 908, 914; 416/228, 235, 416/236 R
See application file for complete search history.

(56) References Cited

U.S. PATENT DOCUMENTS

| | | | |
|---|---|---|---|
| 3,578,264 A * | 5/1971 | Kuethe | 244/200.1 |
| 4,354,648 A * | 10/1982 | Schenk et al. | 244/200.1 |
| 5,669,758 A * | 9/1997 | Williamson | 416/4 |
| 6,910,867 B2 * | 6/2005 | Corten | 416/223 R |
| 2003/0218102 A1 | 11/2003 | Van Dam et al. | |
| 2007/0110585 A1* | 5/2007 | Bonnet | 416/235 |
| 2007/0284848 A1* | 12/2007 | Brownlie | 280/288.1 |
| 2009/0068018 A1* | 3/2009 | Corten | 416/223 R |

FOREIGN PATENT DOCUMENTS

| | | |
|---|---|---|
| DE | 10 2006 017 897 A1 | 10/2007 |
| EP | 1 112 928 A2 | 7/2001 |
| EP | 1 845 258 A1 | 10/2007 |

(Continued)

*Primary Examiner* — Craig Kim
*Assistant Examiner* — Juan G Flores
(74) *Attorney, Agent, or Firm* — Nath, Goldberg & Meyer; Jerald L. Meyer; Tanya E. Harkins

(57) ABSTRACT

A wind turbine blade with a plurality of flow guiding device parts attached to a profiled contour on a pressure side of the blade is described. The longitudinally extending flow guiding device parts are grouped together to form a first flow guiding device group in the transition region of the blade.

9 Claims, 8 Drawing Sheets

(56) References Cited

FOREIGN PATENT DOCUMENTS

| EP | 2 368 034 A1 | 9/2011 |
| EP | 2 368 035 A1 | 9/2011 |
| WO | 02/08600 A1 | 1/2002 |
| WO | 2007/045244 A1 | 4/2007 |
| WO | 2007/065434 A1 | 6/2007 |
| WO | 2007/118581 A1 | 10/2007 |
| WO | 2009/083987 A1 | 7/2009 |

\* cited by examiner

WIND TURBINE BLADE WITH PLURALITY OF LONGITUDINALLY EXTENDING FLOW GUIDING DEVICE PARTS

This is a National Phase Application filed under 35 U.S.C. 371 as a national stage of PCT/EP2010/065075, filed Oct. 8, 2010, and claiming the benefit from European Application No. 09172594.5, filed Oct. 8, 2009, the content of which is hereby incorporated by reference in its entirety.

TECHNICAL FIELD

The present invention relates to a blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, wherein the blade further comprises: a profiled contour including a pressure side and a suction side, as well as a leading edge and a trailing edge with a chord having a chord length extending there between, the profiled contour when being impacted by an incident airflow generating a lift, wherein the profiled contour is divided into: a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region.

BACKGROUND ART

Ideally, a wind turbine blade of the airfoil type is shaped similar to the profile of an aeroplane wing, where the chord plane width of the blade as well as the first derivative thereof increase continuously with decreasing distance from the hub. This results in the blade ideally being comparatively wide in the vicinity of the hub. This again results in problems when having to mount the blade to the hub, and, moreover, this causes great loads during operation of the blade, such as storm loads, due to the large surface area of the blade.

Therefore, over the years, the construction of blades has developed towards a shape, where the blade consists of a root region closest to the hub, an airfoil region comprising a lift-generating profile furthest away from the hub and a transition region between the root region and the airfoil region. The airfoil region has an ideal or almost ideal blade shape with respect to generating lift, whereas the root region has a substantially circular cross-section, which reduces the storm loads and makes it easier and safer to mount the blade to the hub. The root region diameter is preferably constant along the entire root region. Due to the circular cross-section, the root region does not contribute to the energy production of the wind turbine and, in fact, lowers this a little because of drag. As it is suggested by the name, the transition region has a shape gradually changing from the circular shape of the root region to the airfoil profile of the airfoil region. Typically, the width of the blade in the transition region increases substantially linearly with increasing distance from the hub.

As for instance blades for wind turbines have become bigger and bigger in the course of time, and they may now be more than 60 meters long, the demand for optimised aerodynamic performance has increased. The wind turbine blades are designed to have an operational lifetime of at least 20 years. Therefore, even small changes to the overall performance of the blade may over the lifetime of a wind turbine blade accumulate to a high increase in financial gains, which surpasses the additional manufacturing costs relating to such changes. For many years, the focus areas for research have been directed towards improving the airfoil region of the blade, but during the recent few years, more and more focus has been directed towards also improving the aerodynamic performance of the root and transition regions of the blade.

WO2007/065434 discloses a blade wherein the root region is provided with indentations and/or projections in order to decrease the drag from this part of the blade.

WO2007/045244 discloses a blade, wherein the root region and the transition region are designed so as to have at least two separate airfoil profiles in order to increase the lift of these regions.

WO0208600 describes a wind turbine, where the output of the wind turbine is increased by providing the root section of a wind turbine with a member that is designed in such a way that the assembly consisting of the member and the root section can absorb wind energy and increases the overall efficiency of the wind turbine.

WO2007/118581 discloses a blade, where the inboard part of the blade is provided with a flow guiding device on the pressure side of the blade in order to increasing the aerodynamic performance of the blade by increasing the lift. However, the design proposed is very rigid due to the triangular shaped cross-section and consequently the flow guiding device has a tendency to separate from the surface of the blade, when the blade bends.

DISCLOSURE OF THE INVENTION

It is an object of the invention to obtain a new blade, and which overcomes or ameliorates at least one of the disadvantages of the prior art or which provides a useful alternative.

According to a first aspect of the invention, the blade is provided with a plurality of longitudinally extending flow guiding device parts, which are grouped together to form a first flow guiding device group in the transition region of the blade, the first flow guiding device group extending along at least a longitudinal part of the transition region, wherein each of the flow guiding device parts are added to the profiled contour of the blade on the pressure side of the blade, wherein the flow guiding device parts are arranged so as to generate a separation of airflow from the pressure side of the blade at a point between the flow guiding device parts and the trailing edge of the blade, when the blade is impacted by the incident airflow. From this it is clear that the flow guiding device parts are arranged between the leading edge and the trailing edge at a distance (i.e. with a spacing) from the trailing edge. The added device parts are advantageously protruding from the profiled contour of the blade.

Thus, the first flow guiding device group may comprise separate or modular parts in particular in the longitudinal direction of the blade. The modular construction makes the construction more flexible and reduces peel forces at the ends of the flow guiding device parts. Thus, the modular parts have a smaller tendency to break off from the surface of the blade.

Longitudinally extending means that the flow guiding device parts are extending substantially in the longitudinal direction of the blade. Thus, the device parts typically have a first side (nearest the leading edge) and a second side (nearest the trailing edge) as well as a first longitudinal end (nearest the root end) and a second longitudinal end (nearest the tip end).

Advantageously, the first side faces substantially towards the leading edge of the blade.

The flow guiding device is preferably permanently attached to the surface of the wind turbine blade and cannot be actively controlled. Thus, the orientation of the front surface is non-adjustable. Also, it is recognised that the flow guiding device is utilised for increasing the lift and the energy yield. Thus, the flow guiding device may alternatively be denoted as a high lift device.

By incident flow is meant the inflow conditions at a blade section during normal use of the blade, i.e. rotation on a wind turbine rotor. Thus, the incoming flow is the inflow formed by the resultant of the axial wind speed and the rotational component as it is seen by the local section of the blade. By oncoming flow is meant the flow impinging the flow guiding device, i.e. the local flow on the pressure side of the blade meeting and impacting the flow guiding device.

According to one embodiment, the flow guiding device parts are spoiler device parts. Again, it must be pointed out that the parts are preferably non-adjustable and arranged to increase the lift of the wind turbine blade and thus the energy yield of the wind turbine. Accordingly, the spoiler parts are not used for breaking purposes.

According to an advantageous embodiment, the flow guiding device parts comprise planar or plate-shaped elements protruding from the profile. Thereby, a particularly simple design of the flow guiding device parts is provided. Furthermore, this design is much more flexible than the typically wedge-shaped design, which is very rigid. Thus, the planar design has a smaller tendency to have high joint loads, which in worst case can make the flow guiding device parts break off from the surface of the wind turbine blade.

According to an advantageous embodiment, the flow guiding device parts together form a substantially continuous first side facing towards the leading edge of the blade so that the flow guiding device parts together form a flow guiding device, which is arranged and adapted to form a separated airflow between the glow guiding device and the trailing edge of the blade.

According to one advantageous embodiment, the flow guiding device parts are shaped so that they have an inflow surface with a start point oriented towards the leading edge of the blade and an end point oriented towards the trailing edge of the blade, the distance between the inflow surface and the profiled contour increasing from the start point to the end point. Thus, the flow guiding device parts may have a substantially wedge shaped or triangularly shaped profile. However, the inflow surface may also be provided by a planar element oriented backwardly or towards the trailing edge of the blade. The angle of the inflow surface and surface height of a distal point of the inflow surface may advantageously correspond to those described in European patent applications EP08171530.2 and EP08171533.6, respectively, by the present applicant.

According to an advantageous embodiment, the flow guiding device of the blade has a front surface facing towards the oncoming airflow and having an proximal point located at the profiled contour and a distal point located at a distance (i.e. with a spacing) from the profiled contour of the blade, wherein the profiled contour has a surface normal at the proximal point, and wherein the front surface of the flow guiding device comprises at least a first portion, which is angled towards an oncoming airflow so that an average tangent or median line to said first portion forms a first angle with the surface normal being larger than 0 degrees.

Accordingly, the front surface of the flow guiding device, seen from the proximal point, is angled towards the oncoming airflow and thus also towards the leading edge of the blade. Thus, when the profiled contour of the blade is impacted by the incident airflow, the flow guiding device creates an air pocket in front of the front surface, which increases the local pressure in front of the flow guiding device, and which guides the airflow around the flow guiding device. Further, the flow guiding device functions as an obstruction to the flow on the pressure side of the profile. Downstream of the flow guiding device, i.e. typically between the flow guiding device and the trailing edge of the blade, a separation of the airflow occurs. This obstruction is resulting in a higher pressure after the flow guiding device, i.e. between the flow guiding device and the trailing edge of the wind turbine blade, due to a detachment of the flow. Thus, the pressure is increased both in front and behind of the flow guiding device, which in turn increases the lift significantly on this section of the blade at the governing inflow angles for this section. A realistic estimate of the potential performance improvement is 1-2% of annual energy yield compared to conventional wind turbine blades without such flow guiding devices.

The terms average tangent or median line here mean that the first portion of the front surface on average is angled towards the oncoming flow. This corresponds to a linear fit to the first portion of the front surface of the flow guiding device being angled towards the oncoming flow and the leading edge of the blade.

The forwardly angled first portion also results in a tangent to the profile and the tangent or median line to the first portion of the front surface forming an angle being less than 90 degrees.

From the definitions, it is clear that the front surface may comprise a second portion, which is not angled towards the oncoming flow and the leading edge of the blade.

According to an advantageous embodiment, the first angle is at least 5 degrees, or at least 10 degrees, or at least 15 degrees. The first angle may even be at least 20 degrees or at least 25 degrees or at least 30 degrees. Higher angles more efficiently provide the air pocket and may also decrease the drag, since the front surface does not have to protrude as much from the surface in order to provide the build up of pressure in front of the flow guiding device. On the other hand even higher angles make the effective height of the flow guiding device smaller.

According to another advantageous embodiment, the front surface is concave. The front surface of the flow guiding device may guide the airflow across the concave surface and thus contribute further to forming a re-circulating zone in front of the flow guiding device.

However, according to another simple and advantageous embodiment, the front surface is substantially straight. Thus, the first portion of the front surface extends along the entire front surface.

According to another embodiment, the front surface on average is angled towards an oncoming flow. In other words, a line drawn between the proximal point and the distal point will be angled towards the oncoming flow and the leading edge of the blade and thus form an angle with the surface normal being larger than 0 degrees.

According to yet another advantageous embodiment, the first portion of the front surface is located at an outer portion of the front surface, i.e. a part nearest the distal point of the front surface. Thus, the outer portion of the front surface will displace the flow away from the surface of the blade, around the flow guiding device and then away from the blade surface in the region between the flow guiding device and the trailing edge. This forms re-circulating flow zones in advance of—and after—the flow guiding device.

In one embodiment according to the invention, the average tangent or the median line (or a linearly fitted line) to at least the first portion of the flow guiding device further is angled forwardly compared to a second normal being a normal to the chord, so that said line and the second normal form a second angle being at least 0 degrees. Similarly, the second angle may be at least 5 degrees, or at least 10 degrees, or at least 15 degrees, or at least 20 degrees.

Advantageously, the flow guiding device parts are arranged so as to generate a separation of airflow from the pressure side of the blade at a point between the flow guiding device parts and the trailing edge of the blade, when the blade is impacted by the incident airflow. Thereby, a pressure build up is provided in the transverse direction between the flow guiding device parts and the trailing edge of the blade, thus increasing the lift on this particular section of the blade.

According to one advantageous embodiment, individual flow guiding parts are arranged juxtaposed in the longitudinal direction of the wind turbine blade. Thus, the individual flow guiding device parts are preferably provided as separate devices, which can be mounted individually on the surface of the blade.

The flow guiding parts may be arranged so as to abut each other at longitudinal ends. Thus, an oncoming flow will not have a tendency to flow around the individual flow guiding device parts. The flow guiding device parts may advantageously substantially flush with each other.

Alternatively, the flow guiding parts are arranged with a longitudinal spacing between the flow guiding parts. This adds a further small degree of flexibility to the longitudinal direction of the first flow guiding device group. Advantageously, the longitudinal spacing lies at an interval of between 5 mm and 50 mm, or between 5 mm and 40 mm, or between 5 mm and 30 mm. The gap may even be between 5 mm and 20 mm.

According to one advantageous embodiment, the spacing between adjacent flow guiding parts is closed with a flexible body, e.g. made of a rubber material. Accordingly, a flexible body is provided in the spacing between adjacent flow guiding device parts, thus ensuring that the airflow does not flow around the individual flow guiding device parts. Thereby, it is ensured that the pressure build up is achieved along the entire longitudinal extent of the first flow guiding device group and the flexibility of the group is maintained. Furthermore, noise which may arise from the spacing, is removed.

According to an advantageous embodiment, the flow guiding device parts are arranged on a common, longitudinally extending base. Thus, the base typically comprises a first side and second side, as well as a first longitudinal end and a second longitudinal end. In an advantageous embodiment, a substantially planar element or a rib protrudes from the base and extends substantially along the entire longitudinal extent of the base. The planar element may protrude from the first side or the second side of the base and thus be provided similar to an angle bar. Alternatively, the planar element or rib may be arranged between the first side and the second side, e.g. a middle part of the base.

According to another advantageous embodiment, the flow guiding device parts are separated by a recess. The recess preferably extends from a top position of the spoiler device or the flow guiding device part and down to the base part. Thus, spacings between the flow guiding device parts are formed. This provides an alternative design to add further flexibility in the longitudinal direction of the blade. The recesses may comprise a bottom part, i.e. a part nearest the base and the wind turbine blade, where a keyhole design is provided at said bottom part, the key hole having a diameter, which is larger than the immediate width of the recess. This will reduce stress concentrations and peel forces even further.

According to yet another advantageous embodiment, the plurality of longitudinally extending flow guiding device parts comprises individual flow guiding device parts, which are at least partially overlapping in the longitudinal direction of the blade. Thus, the individual flow guiding device parts are individually displaced in the transverse direction of the blade. Accordingly, a first end of a first flow guiding device extends beyond the radial position of a second end of a second flow guiding device part.

In one embodiment, the individual flow guiding device parts are substantially straight in the longitudinal direction. In another embodiment, the individual flow guiding device parts are curved in the longitudinal direction. For example, every second flow guiding device part may be convex and the others concave. This can also be combined with the partially overlapping design.

According to yet another advantageous embodiment, the first flow guiding device group has a corrugated design in the longitudinal direction, advantageously at least a distal point of a plate-shaped element. The design may for instance be wavy in the longitudinal direction and comprise alternating flow guiding device parts being concave and convex, respectively. Alternatively, a trapezium shaped design may be used. These designs have the advantage that the flow guiding device parts may be stretched slightly in the longitudinal direction, when the blade bends. The individual flow guiding device parts may also be corrugated.

In yet another advantageous embodiment, the flexibility or stiffness of the first flow guiding device group may vary, e.g. periodically, in the longitudinal direction of the blade. Thus, the first flow guiding device group may comprise first flow guiding device parts having a first stiffness and second, intermediate flow guiding device parts having a second stiffness. This may for example be achieved by using different plies in the longitudinal direction of the blade, or by changing the fibre direction of such parts made of a fibre-reinforced composite material. Yet again, it is possible to achieve the varying stiffness by manufacturing the flow guiding device as a sandwich structure with different sandwich core materials, e.g. foamed plastic and balsa wood. Thus, it is seen that the first flow guiding device group in principle may be formed as a single unit and mounted to the surface of the wind turbine blade.

Preferably, the flow guiding device group is formed as a longitudinally extending device. According to an advantageous embodiment, the flow guiding device group extends along at least 5% of a longitudinal extent of the wind turbine blade. Yet again, the longitudinal extent of the flow guiding device group may be at least 7%, 10%, 15%, or even 20% of the longitudinal extent or length of the blade.

According to another embodiment, the longitudinally extending flow guiding device group extends along at least 1 meter of the blade, or at least 2 meters, or at least 3 meters, or at least 4 meters, or at least 5 meters, or at least 6 meters, or even at least 8 or 10 meters of the wind turbine blade.

In one embodiment, a minimum distance from a distal point of the flow guiding device group to the profiled contour (or in other words the height of the flow guiding device group), in at least the central longitudinal portion of the flow guiding device group, decreases in the longitudinal direction towards the tip end. Alternatively, the height of the flow guiding device group may be substantially constant in at least the central portion of the flow guiding device group. The height may also vary in the longitudinal direction with alternating parts, in which the height increases, and parts, in which the height decreases.

According to an advantageous embodiment, the wind turbine blade is provided with a number of longitudinally extending flow guiding device parts attached to the profiled contour, the flow guiding device parts comprising: a base having a first longitudinal end nearest the root end and a second longitudinal end nearest the tip end, a first side nearest the leading edge and a second side nearest the trailing edge, as well as a first surface and a second surface, the first surface of the base being attached to the profiled contour, and the second surface facing away from the profiled contour, wherein a longitudinally extending substantially plate-shaped element protrudes from the second surface of the base in direction from the first end towards the second end.

Compared to the known structure of the spoiler described in WO2007/118581 this structure has the advantage that it is more flexible and will reduce peel forces at the ends of the flow guiding device parts. Thereby, the base has a lower tendency to break off from the surface of the blade. Similar to the spoiler device described in WO2007/118581, the present device may be used as a high lift device for adding lift to certain longitudinal areas of the blade, thus contributing to the annual energy yield.

The flow guiding device is advantageously arranged substantially parallel to a longitudinal axis of the wind turbine blade, e.g. the pitch axis. Thus, the longitudinal direction of the flow guiding device and the longitudinal axis of the blade form an angle of less than 30 degrees, or less than 20 degrees.

The flow guiding device is preferably permanently attached to the surface of the wind turbine blade and cannot be actively controlled. Thus, the orientation of the front surface is non-adjustable. Also, it is recognised that the flow guiding device is utilised for increasing the lift and the energy yield. Thus, the flow guiding device may alternatively be denoted as a high lift device.

According to an advantageous embodiment, the profiled contour is divided into: a root region having a substantially circular or elliptical profile closest to the hub, an airfoil region having a lift-generating profile furthest away from the hub, and a transition region between the root region and the airfoil region, the transition region having a profile gradually changing in the radial direction from the circular or elliptical profile of the root region to the lift-generating profile of the airfoil region. This corresponds to the design of conventional, modern wind turbine blades.

According to a particular advantageous embodiment, the flow guiding device is arranged in the transition region of the profiled contour, preferably on the pressure side of the blade. The device can increase the lift in the transition region and thus contribute to the energy yield. Advantageously, the flow guiding device extends substantially along an entire longitudinal extent of the transition region, thus contributing to the increased lift along the entire transition region.

Yet again, the flow guiding device may advantageously extend into the airfoil region. This will add lift to the airfoil region and thus increase the annual energy yield. In principle it may also extend into the root region. Also, the flow guiding device may be arranged in the root region alone, or in the airfoil region alone.

According to one advantageous embodiment, the plate-shaped element extends substantially along the entire longitudinal extent of the base.

According to a first embodiment, the plate-shaped element protrudes from the first side or the second side of the base. Thereby a simple embodiment is provided, wherein the flow guiding device as such is formed as an angle bar. According to a second embodiment, the plate-shaped element protrudes from a point between the first side and the second side of the base, e.g. a middle part. Accordingly, the plate-shaped element may extend substantially from the middle of the base.

According to one advantageous embodiment, the plate-shaped element is substantially planar. This provides a simple embodiment, which is easy and cheap to manufacture. According to another advantageous embodiment, the plate-shaped element is curved, e.g. convex or concave. This may in certain situations be advantageous, e.g. in order to obtain a smooth transition from the blade surface to the plate-shaped element. The plate-shaped element can be moulded in the curved shape or be formed as a planar element, which subsequently is bent to the desired shape.

In one embodiment according to the invention, the plate-shaped element at a point of attachment forms a first angle with the base, the first angle being maximum 80 degrees, advantageously being maximum 70 degrees, more advantageously being maximum 60 degrees. According to another embodiment, the first angle is at least 100 degrees, or advantageously at least 110 degrees, or more advantageously at least 120 degrees. This embodiment is particularly relevant, if the point of attachment is found at the first side or the second side of the base. These embodiments provide simple solutions to angle the plate-shaped forward or backward, which contributes additionally to a pressure build up on the pressure side of the blade.

According to a first advantageous embodiment, the plate-shaped element is angled towards the trailing edge of the blade. Thus, the plate-shaped element is located substantially between the trailing edge and a surface normal to the base at the point of attachment (or seen from the inflow, behind said surface normal). In this embodiment, the plate-shaped element has an inflow surface corresponding to the inflow surface of the spoiler disclosed in WO2007/118581. The angle of the inflow surface and surface height of a distal point of the inflow surface may advantageously correspond to those described in European patent applications EP08171530.2 and EP08171533.6, respectively, by the present applicant. However, compared to e.g. WO2007/118581, this design has a huge structural advantage in not being as rigid.

According to a second advantageous embodiment, the plate-shaped element is angled towards the leading edge of the blade. Thus, the plate-shaped element is located substantially between the leading edge and the surface normal to the base at the point of attachment (or seen from the inflow, in front of said surface normal). Thus, when the profiled contour of the blade is impacted by the incident airflow, the flow guiding device creates an air pocket in front of the front surface, which increases the pressure in front of the flow guiding device, and which guides the airflow around the flow guiding device.

Preferably, the flow guiding device is formed as a longitudinally extending device. According to an advantageous embodiment, the flow guiding device extends along at least 5% of a longitudinal extent of the wind turbine blade. Yet again, the longitudinal extent of the flow guiding device may be at least 7%, 10%, 15%, or even 20% of the longitudinal extent or length of the blade.

According to another embodiment, the longitudinally extending flow guiding device extends along at least 1 meter of the blade, or at least 2 meters, or at least 3 meters, or at least 4 meters, or at least 5 meters, or at least 6 meters, or even at least 8 or 10 meters of the wind turbine blade.

In one embodiment, a minimum distance from the distal point to the profiled contour (or in other words the height of the flow guiding device), in at least the central longitudinal portion of the flow guiding device, decreases in the longitudinal direction towards the tip end. Alternatively, the height of the flow guiding device may be substantially constant in at least the central portion of the flow guiding device. The height may also vary in the longitudinal direction with alternating parts, in which the height increases, and parts, in which the height decreases.

In one advantageous embodiment, the base is formed of a flexible material. Thus, the bending stiffness of the base may be reduced and the base be bent to fit to the surface of the blade without introducing large stresses in a bond line between the base and the plate-shaped element. This may for instance be obtained by forming the base as a composite structure, such as polymer matrix material reinforced with glass fibres. The polymer matrix material may for instance be a polyurethane resin. Yet again, the base may be made of a polymer material, such as ABS plastic or polycarbonate.

Advantageously, a longitudinal extent of the flow guiding device is at least 0.5 meters, or at least 1 meter, or at least 2 meters, or at least 3 meters. Also, a width of the base, i.e. the distance between the first side and the second side of the base, is advantageously between 20 cm and 100 cm, or between 20 cm and 70 cm.

According to one advantageous embodiment, the first surface of the base is curved, and the curvature of the first surface may optionally vary in the longitudinal direction of the base. Thereby, this shape can substantially match the longitudinally varying surface curvature of the profiled contour of the wind turbine blade. However, according to one advantageous embodiment, the base is plane. Thus, it is feasible to manufacture the flow guiding device as an extruded or pultruded element.

The wind turbine blade may advantageously be made of a composite structure, such as a polymer matrix reinforced with a fibre material. The resin may be a thermosetting resin, such as epoxy, vinylester, polyester. The resin may also be a thermoplastic, such as nylon, PVC, ABS, polypropylene or polyethylene. Yet again the resin may be a thermosetting thermoplastic, such as cyclic PBT or PET. The flow guiding device may also be made of such composite materials. The polymer matrix material may also be a polyurethane resin. Yet again, the base may be made of a polymer material, such as ABS plastic or polycarbonate.

The flow guiding device (or flow guiding device parts) may be attached to the surface of the blade by adhering it to the surface of the blade. It may also be bolted or riveted to the surface of the blade. It can also be mounted to the surface of the blade by use of screws. In principle, it may also be possible to attach the flow guiding device to the surface of the blade by use of magnet means, if the flow guiding device and/or the blade comprises a magnetisable material.

Further, the invention recognises that the flow guiding device parts according to the invention also could be used as Gurney flap like devices, i.e. arranged at the trailing edge of the blade without being adapted to create a separated airflow between the device parts and the trailing edge.

According to another aspect, the invention provides a wind turbine comprising a number of blades, preferably two or three, according to any of the aforementioned embodiments.

BRIEF DESCRIPTION OF THE DRAWINGS

The invention is explained in detail below with reference to the drawing(s), in which.

DETAILED DESCRIPTION OF THE INVENTION

Figure 1:
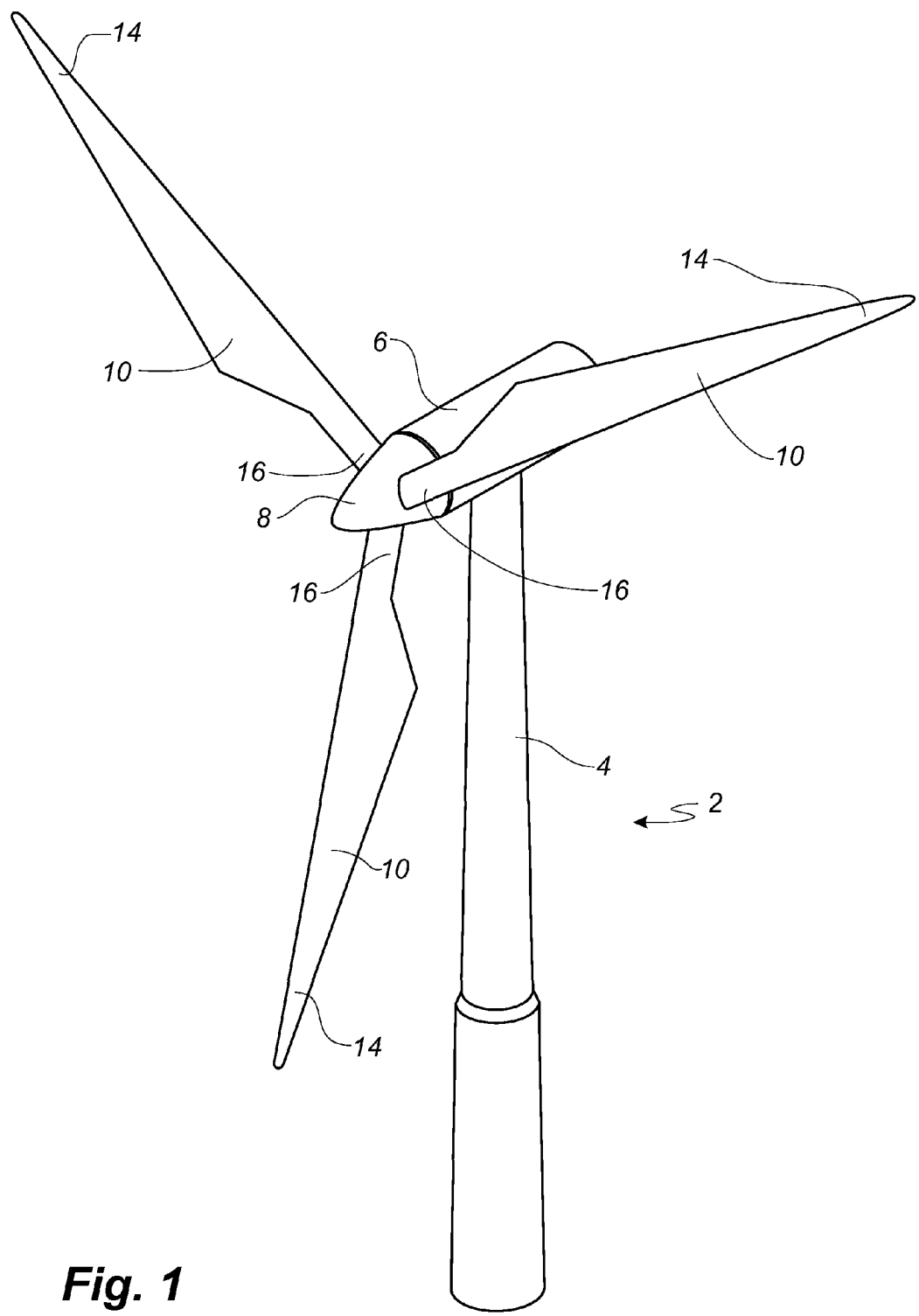
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 3:
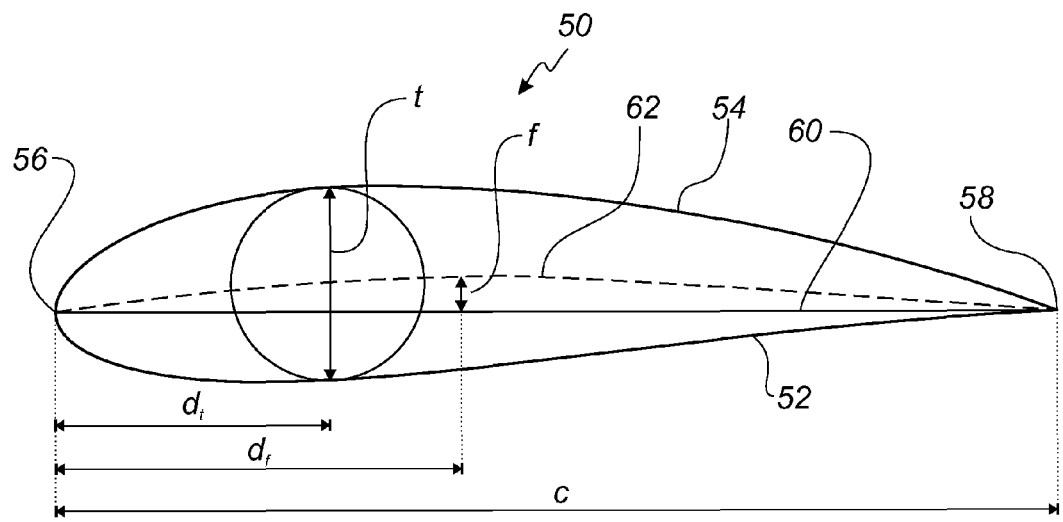
FIG. 3 shows a schematic view of an airfoil profile.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward side and the leeward side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Figure 2:
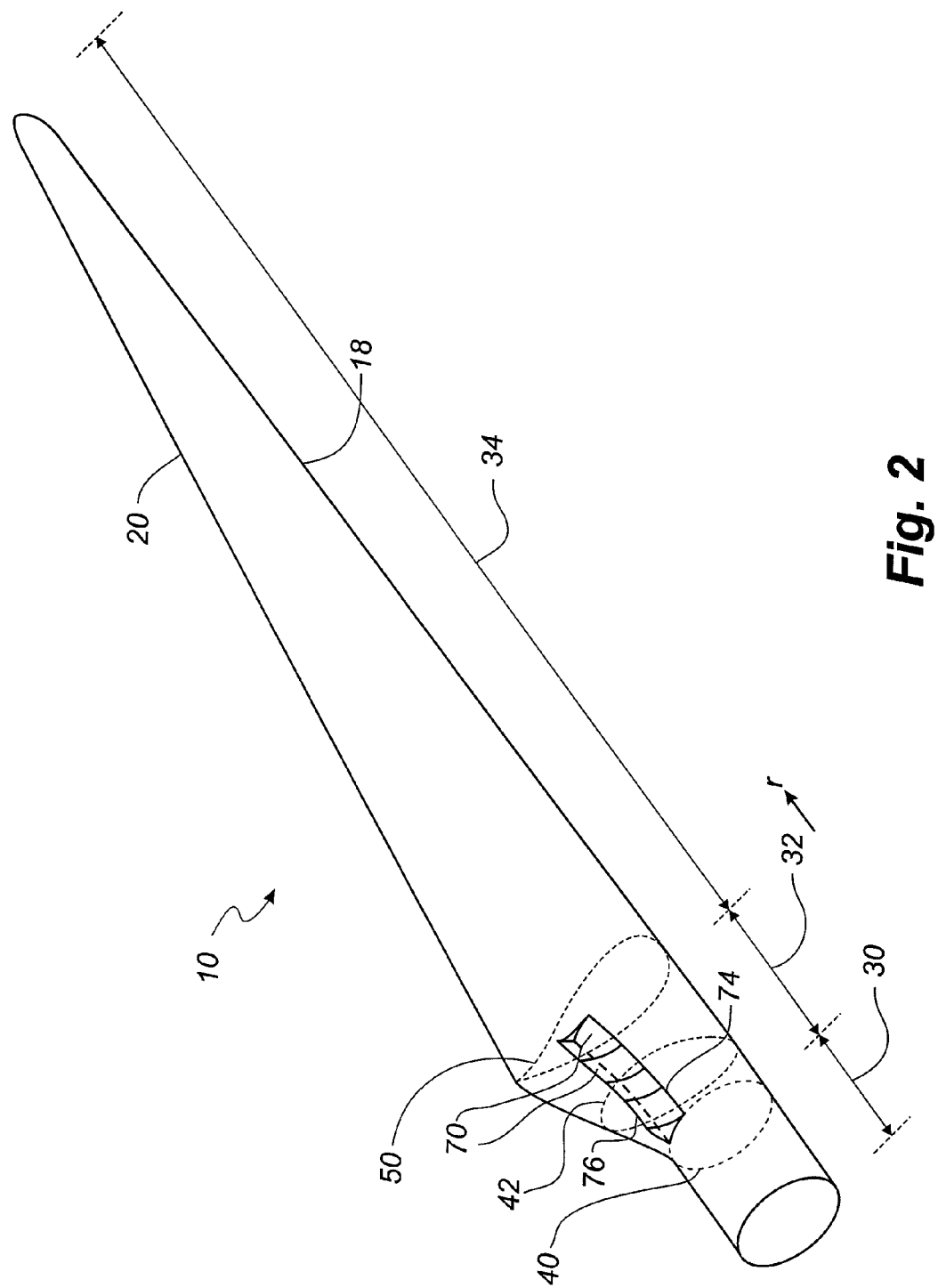
FIG. 2 shows a schematic view of a first embodiment of a wind turbine blade provided with flow guiding device parts according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The width of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

The chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 according to the invention is provided with a number of flow guiding device parts 70, which are grouped together and protrude from the pressure side of the blade in at least the transition region 32 of the blade. However, advantageously the flow guiding device parts 70 may also extend into the airfoil region 34 and/or the root region 30 of the blade. The flow guiding device parts 70 comprise an inflow surface with a start point 74 and an end point 76.

Figure 4:
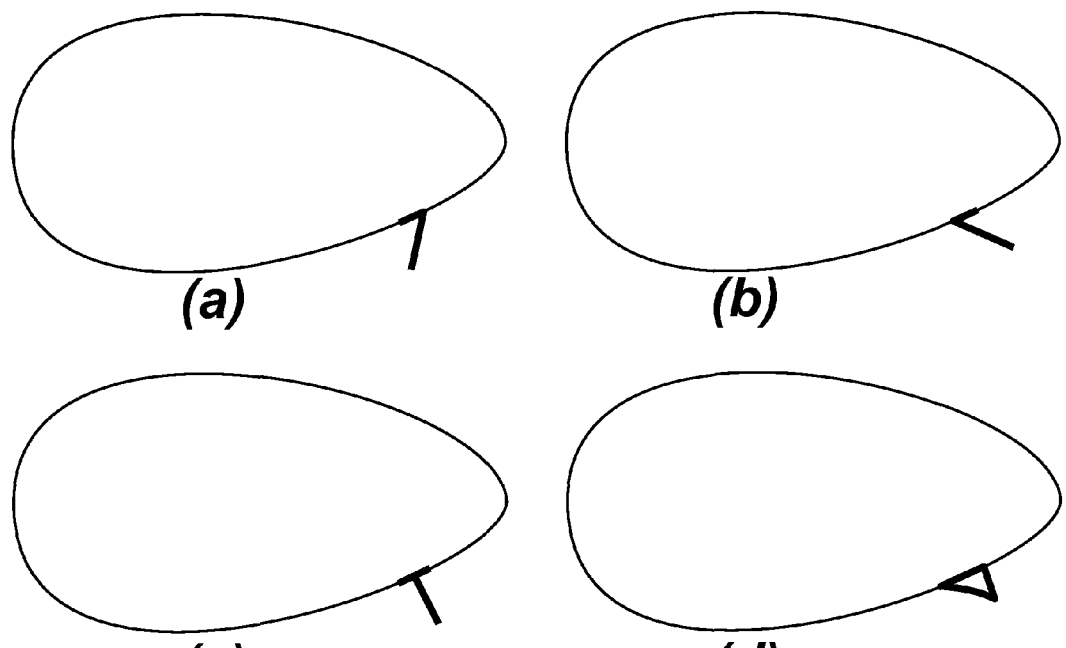
FIG. 4 shows various cross-sectional designs of flow guiding device parts according to the invention.

The cross sectional design of the flow guiding device parts may take many shapes and still obtain a pressure build up on the pressure side of the blade and thus increase the lift of the particular blade section. As a first example, the flow guiding device parts may comprise a plate-shaped element or rib, which is angled forwards towards the leading edge of the blade as shown in FIG. 4 (a). In this embodiment, the plate-shaped element is located in front of a normal to the profiled contour at an attachment point of the plate-shaped element, i.e. between said normal and the leading edge of the blade. This embodiment has the advantage that an additional pressure is built up in front of the flow guiding device parts. A second example is shown in FIG. 4 (b), in which a plate-shaped element is angled backwards towards the trailing edge of the blade. A third example is shown in FIG. 4 (c), in which a plate-shaped element protrudes substantially normal to the surface of the wind turbine blade. A forth example is shown in FIG. 4 (d), in which the flow guiding device parts comprise a triangular or wedge-shaped cross section similar to those shown in WO2007/118581.

In FIGS. 4 (b) and (d), the flow guiding device parts comprise an inflow surface with a start point and an end point. The angles and shape of the inflow surface may advantageously correspond to the designs proposed in European patent application EP08171530.2 by the present applicant. In FIGS. 4 (a)-(d), the distance of a distal point of the flow guiding device to the surface of the blade may advantageously correspond to the designs proposed in European patent application EP08171533.6 by the present applicant.

Figure 18:
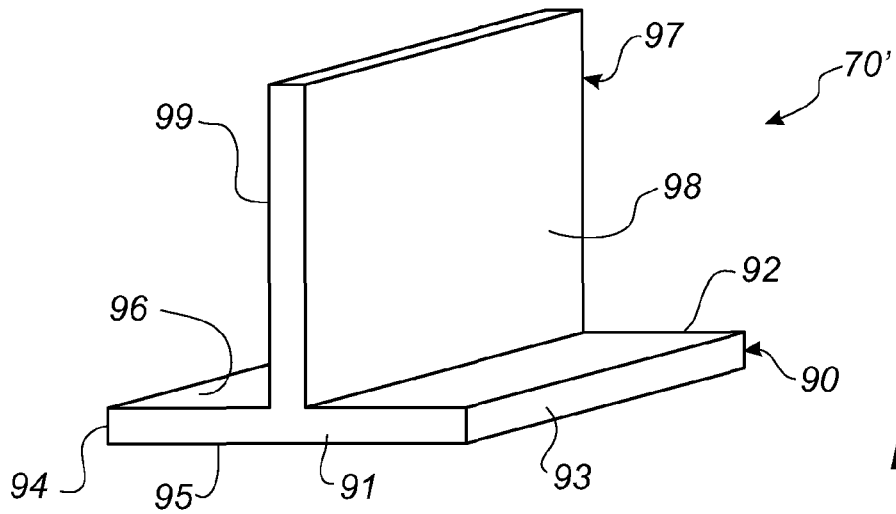
FIG. 18 shows a schematic view of a first embodiment of a flow guiding device part according to the invention.

FIG. 18 shows a first embodiment of a flow guiding device part 70' according to the invention. The flow guiding device is formed as a longitudinally extending device having a base 90. The base 90 comprises a first longitudinally end 91, which—when the flow guiding device 70' is attached to the profiled contour of the wind turbine blade 10—is arranged nearest the root end of the blade and a second longitudinal end 92, which is arranged nearest the tip end of the blade 10. The base 90 further comprises a first side 93 arranged nearest the leading edge 18 of the blade 10 and a second side 94 arranged nearest the trailing edge 20 of the blade. The base 90 also comprises a first surface 95, which is attached to surface of the blade 10, and a second surface, which faces away from the surface of the blade 10. A plate-shaped element 97 protrudes from the second surface 96 of the base 90 from a part substantially in the middle between the first side 93 and the second side 94. The plate-shaped element 97 extends longitudinally along the entire longitudinal extent of the base 90. The plate-shaped element comprises a front surface 98, which faces towards the leading edge 18 of the blade 10, and a back surface 99, which faces towards the trailing edge 20 of the blade 10. During operation of the wind turbine, the front surface 98 of the plate-shaped 97 element is thus impacted by an oncoming airstream. The plate-shaped element 97 functions as an obstruction to the flow on the pressure side of the profile. After the flow guiding device, i.e. between the flow guiding device and the trailing edge of the blade, a separation of the airflow occurs. This obstruction is resulting in a higher pressure after the flow guiding device, i.e. between the flow guiding device and the trailing edge of the wind turbine blade, due to a detachment of the flow. This higher pressure contributes to a higher lift in the longitudinal section, in which the flow guiding device 70' is arranged.

Figure 19:
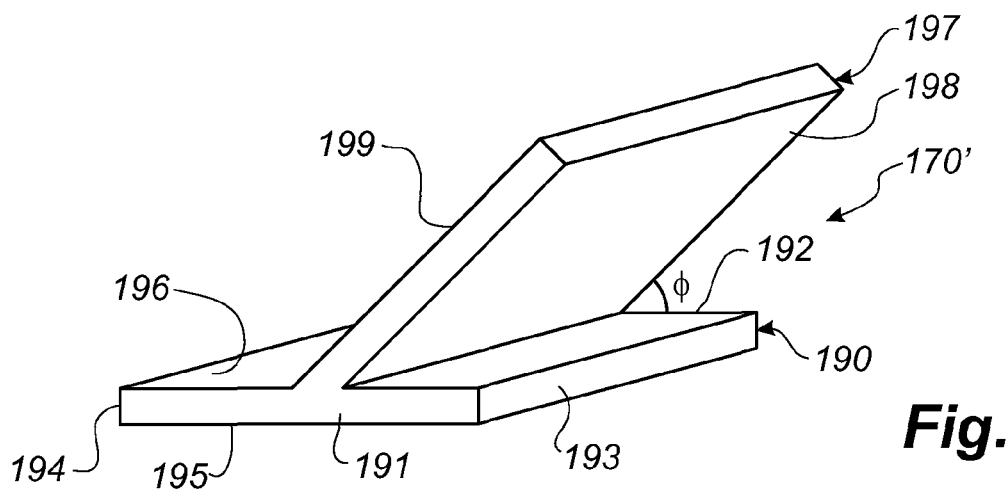
FIG. 19 shows a schematic view of a second embodiment of a flow guiding device part according to the invention.

FIG. 19 shows a second embodiment of a flow guiding device part 170' according to the invention, wherein like numerals refer to like parts of the embodiment shown in FIG. 18. Therefore, only the difference between the two embodiments is described. In this embodiment, the plate-shaped element 197 is angled forward so that the plate-shaped element 197 forms a first angle $\phi$ with the base 190. Thus, the front surface 198 also faces slightly downwards towards the base 190 and the surface of the blade 10. When the front surface 198 during normal operation of the wind turbine is impacted by an oncoming airstream, an air pocket is formed in front of the front surface, which increases the pressure in front of the flow guiding device, and which guides the airflow around the flow guiding device 170'. Thus, an increased pressure is built up both in front of and behind the flow guiding device 170'. Thereby, the lift is increased along a large part of the blade section. The first angle $\phi$ is advantageously at least 20 degrees and angles around 30 to 45 degrees have shown excellent results, both with respect to the gain in lift and with regards to the flexibility of the flow guiding device.

Figure 20:
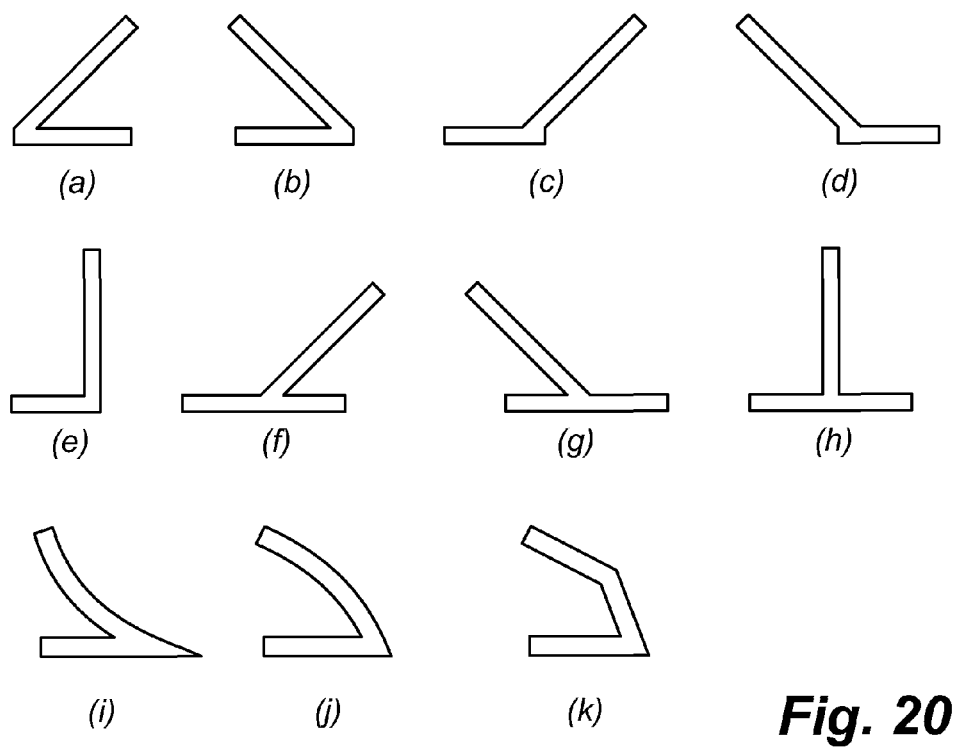
FIG. 20 shows cross-sections of various designs of flow guiding device parts according to the invention.

However, the plate-shaped element need not be protruding substantially normal to the base (and the profiled contour of the blade) as shown in FIG. 18 or be forwardly angled as shown in FIG. 19. Also, the plate-shaped element need not be protruding from a middle part of the base. FIG. 20 shows variations of the cross-sectional design of the flow guiding device parts.

FIGS. 20 (a)-(e) show different examples of flow guiding device parts, which as such are shaped as angle bars. In all the embodiments, it is assumed that the leading edge of the blade is arranged to the right and the trailing edge to the left. Thus, during normal operation of a wind turbine, the oncoming airstream is from the right to the left.

In embodiment (a), the plate-shaped element is angled forwards and protrudes from the second side of the base. In embodiment (b), the plate-shaped element is angled backwards and protrudes from the first side of the base. In these two embodiments, the angle between the plate-shaped elements of (a) and (b) forms an angle of 45 degrees with the base.

In embodiment (c), the plate-shaped element is angled forwards and protrudes from the second side of the base. In embodiment (d), the plate-shaped element is angled backwards and protrudes from the second side of the base. In these two embodiments, the plate-shaped element forms an angle of approximately 135 degrees with the base.

In embodiment (e), the plate-shaped element protrudes substantially normally to the base from the first side of the base.

Embodiments (f)-(h) show embodiments, where the plate-shaped element protrudes from a middle part of the base, i.e. between the first side and the second side of the base. The plate-shaped element may e.g. be forwardly angled as shown in embodiment (f), be backwardly angled as shown in embodiment (g) or protrude normally from the base as shown in embodiment (h).

In all the previous embodiments, the plate-shaped element is designed as a planar element. However, the plate-shaped elements of the previous embodiments may be slightly bent or curved, e.g. in a concave shape as shown in embodiment (i) or a convex shape as shown in embodiment (j). Yet again, the plate-shaped element may comprise different planar parts, which are differently angled with respect to the base, the plate-shaped element thus having a discontinuous design as shown in embodiment (k).

Figure 21:
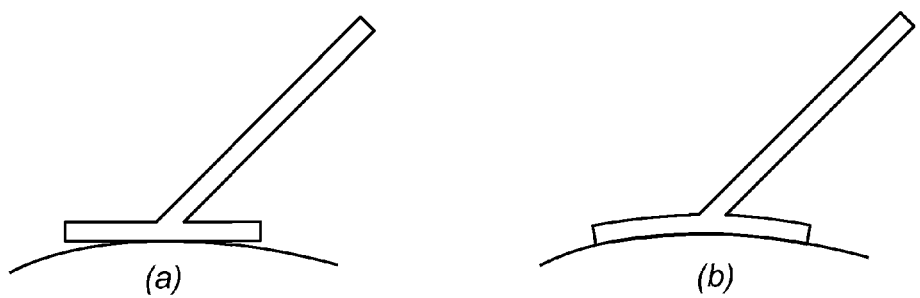
FIG. 21 illustrates the attachment of flow guiding device parts to a surface of a wind turbine blade.

The flow guiding device is typically mounted on a curved surface of the wind turbine blade. Thus, the sides of the base may potentially detach slightly from the surface of the blade as shown in FIG. 21 (a). Accordingly, it is advantageous that the base of the flow guiding device is made of a flexible material so that stress formations are reduced along the entire base plate. Further, by making the plate-shaped element flexible, peel forces are reduced at the ends of the flow guiding device. This can be obtained by forming the base as a relatively thin plate, e.g. made of a composite material, such as a polymer matrix material reinforced with fibreglass. Alternatively, the base may be slightly curved as shown in FIG. 21 (b) so as to complement the surface of the wind turbine blade. The base may be attached to the surface of the blade by e.g. adhering the first surface of the base to the surface of the blade, or by connecting it to the blade via connection means, such as screws or nuts and bolts. It is also possible to mould the flow guiding device on to the surface of the blade. Yet again, the flow guiding device may be attached to the blade surface by use of magnet means, if for instance the base plate and/or the blade shell comprise a magnetisable material. Also, the curvature of the first surface of the base may vary in the longitudinal direction of the base in order to accommodate to the varying shape of the wind turbine blade.

Figure 5:
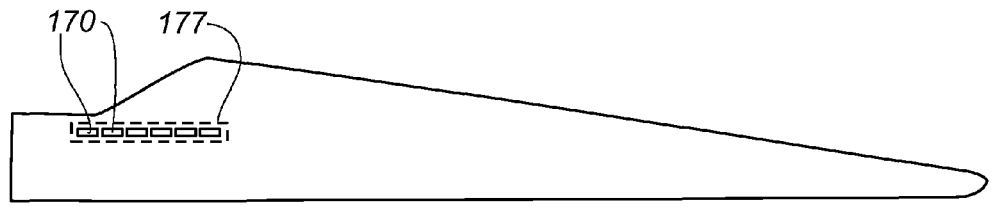
FIG. 5 shows a schematic view of a second embodiment of a wind turbine blade provided with flow guiding device parts according to the invention.

FIG. 5 shows a schematic view of a wind turbine blade provided with flow guiding device parts 170, which are grouped together in a first flow guiding device group 177 in the transition region of the blade and protruding from the pressure side of the blade. The first flow guiding device group 177 further extends slightly into the root region and the airfoil region of the blade. The first flow guiding device group 177 is shown as extending substantially parallel to a longitudinal axis (or pitch axis) of the blade. However, it may be arranged slightly skewed or curved compared to said longitudinal axis.

Figure 6:
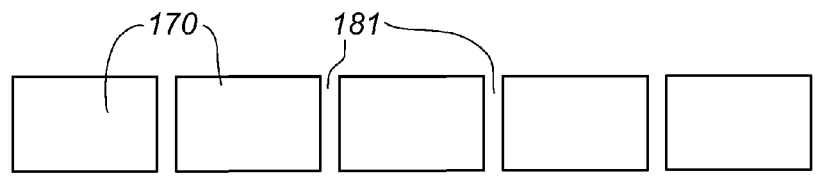
FIG. 6 shows a schematic view of a first embodiment of flow guiding device parts according to the invention, seen from the side.

FIG. 6 depicts the flow guiding device group 177, seen from the side. As can be seen the group 177 comprises a number of individual flow guiding device parts 170, which mutually are separated by gaps 181. The individual parts may for instance have a longitudinal extent of between 50 cm and 200 cm, e.g. 100 cm. The gaps 181 between adjacent flow guiding device parts 170 may for instance be between 5 mm and 30 mm. According to another embodiment (not shown), the flow guiding device parts abut each other. The shown modular construction makes the construction of the flow guiding device group 170 more flexible than conventional longitudinally extending flow guiding devices and reduces peel forces, which normally occur at the ends of the flow guiding devices. Thus, the modular parts will have a smaller tendency to break off from the surface of the blade.

Figure 7:
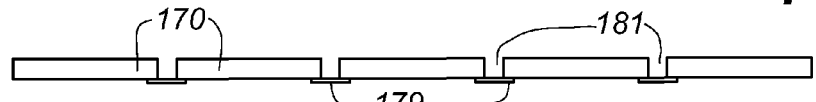
FIG. 7 shows a schematic view of the first embodiment of flow guiding device parts according to the invention, seen from the top.

FIG. 7 shows the flow guiding device parts 170 seen from the top, here depicted as a proximal part of a plate-shaped element. In the shown embodiment, the gaps 181 between adjacent flow guiding device parts 170 are closed by intermediate elements 179 made of a flexible material, such as rubber. In this particular embodiment, the intermediate elements 179 are attached to a front surface of the plate-shaped elements 170.

Figure 8:
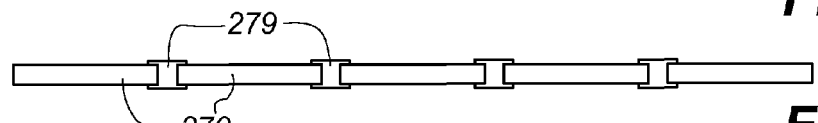
FIG. 8 shows a schematic view of a second embodiment of flow guiding device parts according to the invention, seen from the top.

FIG. 8 shows a second embodiment of flow guiding device parts 270 according to the invention. In this embodiment the gaps are also closed by intermediate elements 279 made of a flexible material, such as rubber. In this embodiment, the intermediate parts fill the entire gap between the flow guiding device parts 270 and are attached to both a front surface and back surface of the flow guiding device parts 270.

Figure 9:
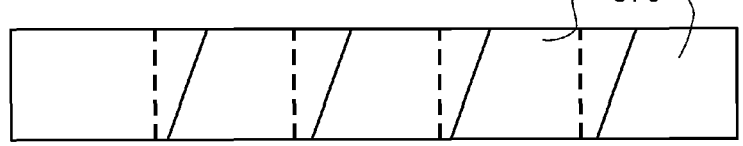
FIG. 9 shows a schematic view of a third embodiment of flow guiding device parts according to the invention, seen from the side.

FIG. 9 shows a schematic view of a third embodiment of flow guiding device parts 370 according to the invention, seen from the side. In this embodiment, the flow guiding device parts 370 are partially overlapping in the longitudinal direction. Accordingly, one end of one flow guiding device part extends beyond a second end of a second flow guiding device part. The ends may be slightly angled as shown in the Figure.

Figure 10:
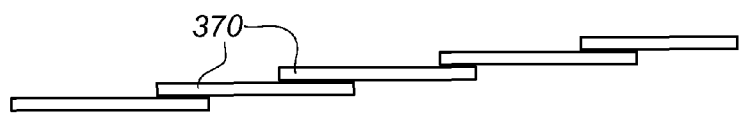
FIG. 10 shows a schematic view of the third embodiment of flow guiding device parts according to the invention, seen from the top.

FIG. 10 shows a schematic view of the third embodiment of flow guiding device parts 370 according to the invention, seen from the top. It can be seen the flow guiding device parts 370 are staggered in the longitudinal direction. The back surface of one flow guiding device part may abut the front surface of a second flow guiding device part, or there may be a small gap in the transverse direction of the blade.

Figure 11:
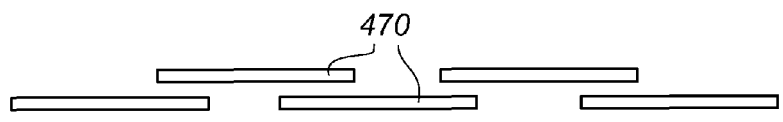
FIG. 11 shows a schematic view of the fourth embodiment of flow guiding device parts according to the invention, seen from the top.

FIG. 11 shows a schematic view of the fourth embodiment of flow guiding device parts 470 according to the invention, seen from the top. In this embodiment, the flow guiding device parts are alternately arranged in front of and behind other flow guiding device parts.

Figure 12:
FIG. 12 shows a schematic view of the fifth embodiment of flow guiding device parts according to the invention, seen from the top.

FIG. 12 shows a schematic view of the fifth embodiment of flow guiding device parts 570 according to the invention, seen from the top, which is similar to the fourth embodiment with the exception that the flow guiding device parts 570 are alternately convex and concave in the longitudinal direction. In the shown embodiment, two flow guiding device parts are arranged behind the others. However, they may also advantageously be arranged in front of the other flow guiding device parts, thereby obtaining a slightly different overall design.

Figure 13:
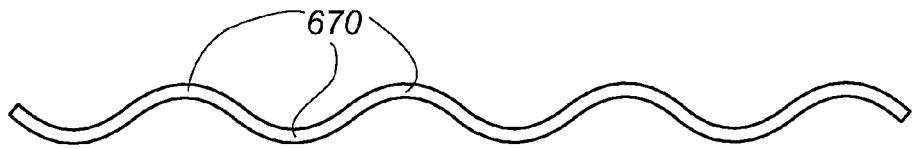
FIG. 13 shows a schematic view of the sixth embodiment of flow guiding device parts according to the invention, seen from the top.

FIG. 13 shows a schematic view of the sixth embodiment of flow guiding device parts 670 according to the invention, seen from the top. In this embodiment, the first flow guiding device group consists of alternately convex and concave flow guiding device parts, which are interconnected. Overall, a corrugated design is obtained in the longitudinal direction of the blade.

Figure 14:
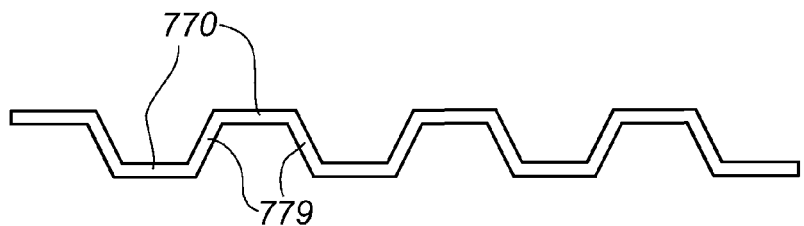
FIG. 14 shows a schematic view of the seventh embodiment of flow guiding device parts according to the invention, seen from the top.

FIG. 14 shows a schematic view of the seventh embodiment of flow guiding device parts according to the invention, seen from the top, in which individual flow guiding device parts 770 are interconnected via intermediate flow guiding device part 779. Overall, an alternative corrugated design is obtained in the longitudinal direction of the blade.

Figure 15:
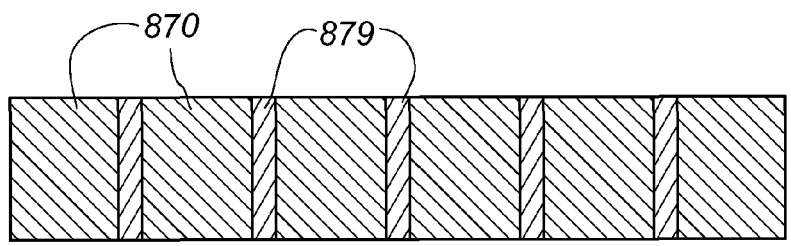
FIG. 15 shows a schematic view of the eighth embodiment of flow guiding device parts according to the invention, seen from the side.

FIG. 15 shows a schematic view of the eighth embodiment of flow guiding device parts according to the invention, seen from the side. In this embodiment, the first flow guiding device group comprises a number of individual flow guiding device parts 870, which are interconnected by intermediate flow guiding device parts 879. The flow guiding device 870 parts have a first stiffness, and the intermediate flow guiding device parts 879 have a second stiffness. This may for example be achieved by using different plies in the longitudinal direction of the blade, or by changing the fibre direction of such parts made of a fibre-reinforced composite material. Yet again, it is possible to achieve the varying stiffness by manufacturing the flow guiding device as a sandwich structure with different sandwich core materials, e.g. foamed plastic and balsa wood.

Figure 16:
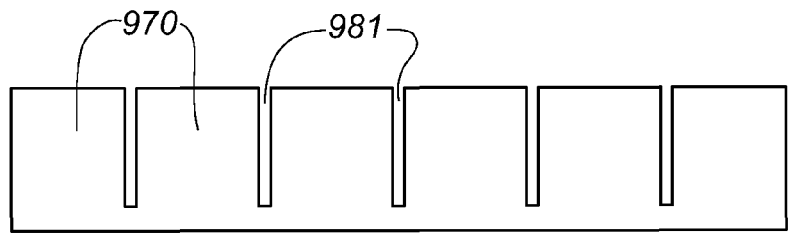
FIG. 16 shows a schematic view of the ninth embodiment of flow guiding device parts according to the invention, seen from the side.

FIG. 16 shows a schematic view of the ninth embodiment of flow guiding device parts 970 according to the invention, seen from the side. In this embodiment, the flow guiding device parts 970 are arranged on a common, longitudinally extending base. Thus, the base typically comprises a first side and second side, as well as a first longitudinal end and a second longitudinal end as shown in FIG. 18. The flow guiding device 970 parts are separated by recesses 981 or gaps.

Figure 17:
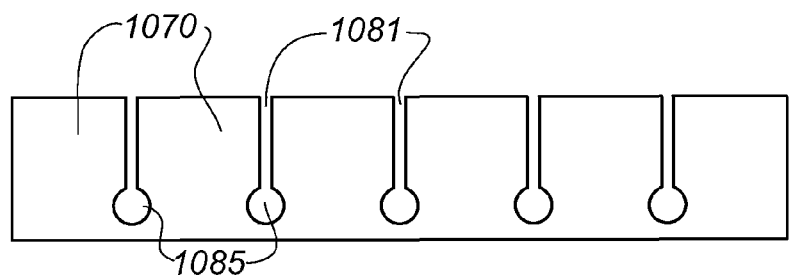
FIG. 17 shows a schematic view of the tenth embodiment of flow guiding device parts according to the invention, seen from the side.

FIG. 17 shows a schematic view of the tenth embodiment of flow guiding device parts 1070 according to the invention, seen from the side, similar to the ninth embodiment. In this embodiment, the recesses 1018 comprise a bottom part, i.e. a part nearest the base and the wind turbine blade, where a keyhole design 1085 is provided at said bottom part, the key hole having a diameter, which is larger than the immediate width of the recesses 1081. This will reduce stress concentrations and peel forces even further.

Figure 22:
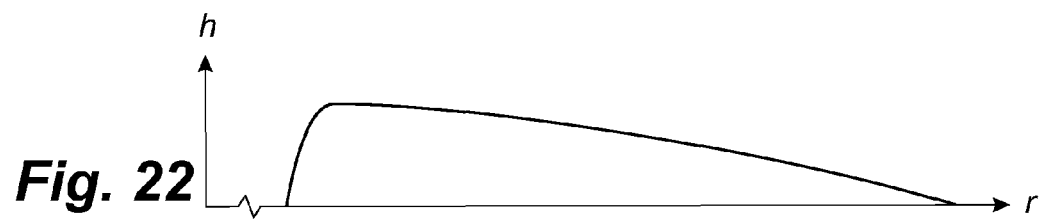
FIG. 22 shows a rear edge height of a first flow guiding device according to the invention as a function of the radial distance from the hub.

In a first embodiment, a height h of the first flow guiding device group may as shown in FIG. 22 be decreasing in the longitudinal direction (or radial distance from the hub) towards the tip end r of the blade—at least within the central longitudinal portion 71 of the first flow guiding device group. The height of the flow guiding device is shown as a function of the radial distance r from the hub in FIG. 20. At the longitudinal end of the flow guiding device group nearest the hub, the flow guiding device group is rounded or tapered in order to obtain a smooth transition to the profiled contour of the blade.

Figure 23A:
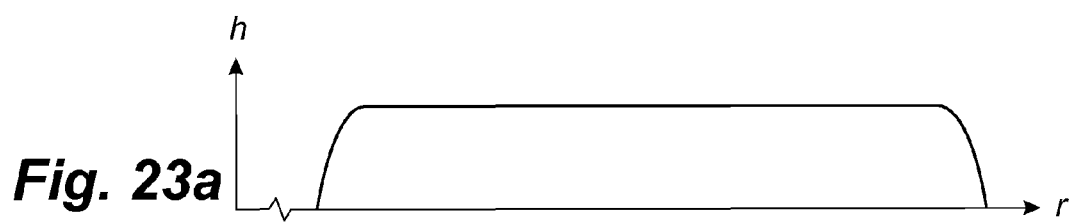
FIG. 23a shows the rear edge height of a second flow guiding device according to the invention as a function of the radial distance from the hub.

In a second embodiment, the height of the flow guiding device group is as shown in FIG. 23a substantially constant in the longitudinal direction of the blade, at least within the central longitudinal portion 71. Furthermore, it is seen that the flow guiding device group can be rounded or tapered near the longitudinal ends of the flow guiding device group in order to obtain a smooth transition to the profiled contour of the blade.

Figure 23B:
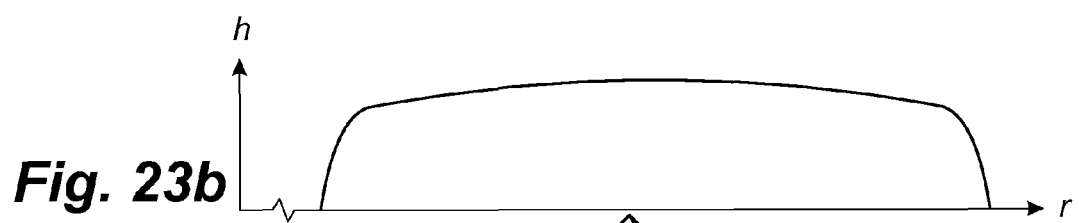
FIG. 23b shows the rear edge height of a third flow guiding device according to the invention as a function of the radial distance from the hub

In a third embodiment, the height of the flow guiding device group increases in a first longitudinal part and decreases in a second longitudinal part as shown in FIG. 23b.

Figure 24:
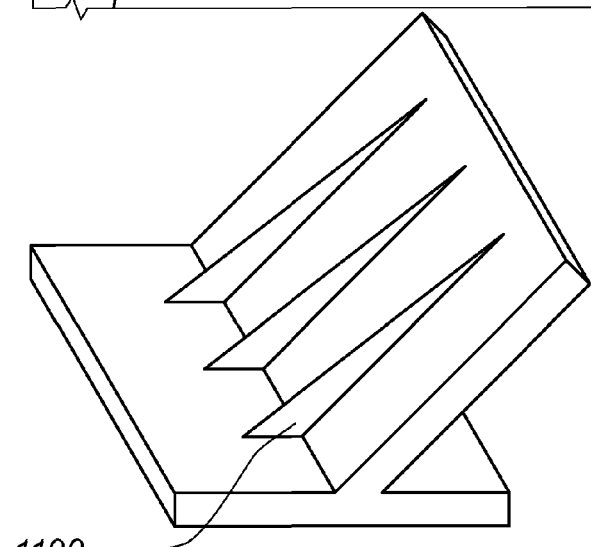
FIG. 24 shows an embodiment of flow guiding device parts provided with stiffening members.

When the flow guiding device part is shaped as a plate-shaped element as shown in FIG. 19, the device part may advantageously be provided with stiffening devices 1190 arranged at the back surface of the plate-shaped element as shown in FIG. 24. The stiffening devices may advantageously be formed as triangular shaped plates between the back surface and the base of the device. The stiffening devices are advantageously arranged substantially in the transverse direction of the blade, i.e. substantially parallel to the local chord.

Figure 25:
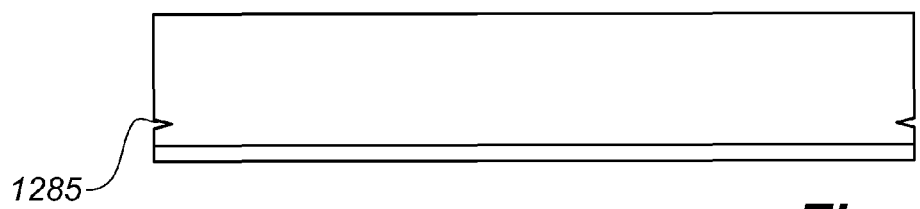
FIG. 25 shows an embodiment, where ends of the device parts are provided with notches.

The flow guiding device or individual modules of the group of flow guiding device may advantageously be provided with a notch 1285, a cut or the like at one or both ends of the device as shown in FIG. 25. This will reduce stress concentrations and peel forces even further similar to the keyhole design shown in FIG. 17. The notches may be useful relevant shape such as triangular, rounded square or the like.

The invention has been described with reference to a preferred embodiment. However, the scope of the invention is not limited to the illustrated embodiment, and alterations and modifications can be carried out without deviating from the scope of the invention.

The invention claimed is:

1. A blade (10) for a rotor of a wind turbine (2) having a substantially horizontal rotor shaft, said rotor comprising a hub (8), from which the blade (10) extends substantially in a radial direction when mounted to the hub (8), the blade having a longitudinal direction (r) with a tip end (14) and a root end (16) and a transverse direction, the blade further comprising:
   a profiled contour (40, 42, 50) including a pressure side and a suction side, as well as a leading edge (18) and a trailing edge (20) with a chord having a chord length extending there between, the profiled contour, when being impacted by an incident airflow, generating a lift, wherein the profiled contour is divided into:
   a root region (30) having a substantially circular or elliptical profile closest to the hub,
   an airfoil region (34) having a lift-generating profile furthest away from the hub, and
   a transition region (32) between the root region (30) and the airfoil region (34), the transition region (32) having a profile gradually changing in the radial direction from the circular or elliptical profile of the root region to the lift-generating profile of the airfoil region, characterised in that
   the blade is provided with a plurality of longitudinally extending flow guiding device parts (70), which are grouped together to form a first flow guiding device group (77) in the transition region (32) of the blade (10), the first flow guiding device group extending along at least a longitudinal part of the transition region (32), wherein
   the flow guiding device parts having a first side near the leading edge of the blade, a second side near the trailing edge of the blade, a first longitudinal end nearest the root, and a second longitudinal end nearest the tip;
   each of the flow guiding device parts (70) is added to the profiled contour (40, 42, 50) of the blade on the pressure side (52) of the blade (10), the flow guiding device parts together forming a substantially continuous first side facing towards the leading edge of the blade so the flow guiding parts together form a flow guiding device, and wherein the flow guiding device parts (70) are arranged so as to generate a separation of airflow from the pressure side of the blade at a point between the flow guiding device parts (70) and the trailing edge (20) of the blade, when the blade is impacted by the incident airflow;
   the flow guiding device parts are spoiler device parts, wherein obstruction results in a higher pressure after the flow guiding device parts and between the flow guiding device parts and the trailing edge due to a detachment of airflow.

2. The wind turbine blade according to claim 1, wherein the flow guiding device parts are shaped as planar elements protruding from the profile.

3. The wind turbine blade according to claim 1, wherein the flow guiding device parts are shaped so that they have an inflow surface with a start point (74) oriented towards the leading edge (18) of the blade (10) and an end point (76) oriented towards the trailing edge (20) of the blade (10), the distance between the inflow surface (72) and the profiled contour (40, 42, 50) increasing from the start point (74) to the end point (76).

4. The wind turbine according to claim 1, wherein individual flow guiding parts (70) are arranged juxtaposed in the longitudinal direction of the wind turbine blade.

5. The wind turbine blade according to claim 4, wherein the flow guiding parts are arranged so as to abut each other at longitudinal ends.

6. The wind turbine blade according to claim 1, wherein the flow guiding device parts are arranged on a common, longitudinally extending base.

7. The wind turbine blade according to claim 1, wherein the individual flow guiding device parts are substantially straight in the longitudinal direction.

8. The wind turbine blade according to claim 1, wherein the individual flow guiding device parts are curved in the longitudinal direction.

9. The wind turbine blade according to claim 1, wherein the first flow guiding device group has a corrugated design in the longitudinal direction.

* * * * *